UNITED STATES PATENT OFFICE 2,562,148

LOW WATER-LOSS CEMENT SLURRY

Peggy J. Lea, Kansas City, Mo., and Henry B. Fisher, Bartlesville, Okla., assignors to Phillips Petroleum Company, a corporation of Delaware No Drawing. Application July 11, 1949, Serial No. 104,154

30 Claims. (Cl. 166—22)

This invention relates to low-water loss cement slurries. In one specific aspect it relates to low-water loss cement slurries comprising hydraulic cement, such as Portland cement, with or without non-cementing inert granular aggregate material, which hydraulic cement may or may not contain the usual minor additives common to hydraulic cements, such as calcium sulfate and/or calcium chloride in amounts up to 3%, as an example, to retard the time of set, a small but effective amount of a water loss reducing additive soluble in an aqueous hydraulic cement slurry selected from the group consisting of starch ethers, and salts of said ethers, starch ethers with alkyl groups of 4 carbon atoms or less being preferred, and the alkali metal, alkaline earth metal and ammonium salts of said ethers being preferred, and sufficient water to make a slurry.

In the art of cementing oil wells and in grouting cracks in masonry structures there is a tendency for the cement slurry to lose water at such an extent that it becomes dehydrated, set, or cracked prematurely, with the result that it cannot be properly placed in position due to an increase in viscosity of the slurry, and resulting increases in force necessary to pump or move the slurry into position. This deleterious dehydration is increased in many oil wells by the modern practice of scratching, or scraping the drilling mud from the wall of the well by mechanical means prior to placing the cement, which often exposes porous formations which will absorb the water from the slurry. This is particularly important when oil sands are penetrated, as artificial contamination of oil sands with water will often cause shaley impurities in the sand to swell and reduce the permeability of said oil sand to a very great extent. Therefore, water lost from the slurry tends to seal off the formation to oil flow. When it is intended to cement with slurry, and then gun perforate the hardened slurry, the gun perforator may not be able to penetrate into the formation beyond the slurry to a sufficient depth to penetrate into the region beyond that in which the shaley impurities are swollen by the water extracted by the formation from the slurry. In such cases the oil production rate of the well may be severely reduced by water contamination from the slurry.

We have found that by adding a small but effective amount of a selected additive comprising a water-loss reducing additive soluble in an aqueous hydraulic cement slurry selected from the group consisting of starch ethers, and salts of said ethers, starch ethers with alkyl groups of 4 carbon atoms or less being preferred, and the alkali metal, alkaline earth metal and ammonium salts of said ethers being preferred, to a slurry of water and a hydraulic cement, preferably ordinary commercial Portland cement containing the usual additives, that the water loss as determined by filtration tests is greatly reduced and contamination of the formation is substantially prevented.

One object of the present invention is to provide an improved low water-loss cement slurry useful in grouting in general in cementing the walls of wells, and for cementing pipe in wells.

Another object is to provide a low water-loss cement which will not contaminate the earth formations in bore holes with water to any substantial extent.

Another object is to provide a cement slurry suitable for use in oil well cementing operations.

Numerous other objects and advantages will be apparent upon reading the accompanying specification and claims.

In preparing the slurry the dry ingredients comprising hydraulic cement, with or without additives for increasing the time of set, the inert filler material, such as sand or crushed limestone, and said selected additive may be mixed together and later mixed with water, or any of them may be mixed separately with water, and then mixed together to form the cement slurry, as long as the mixing of the hydraulic cement with water is done promptly before placing the slurry in position.

By hydraulic cement we intend to include all mixtures of lime, silica, and alumina, or of lime and magnesia, silica, and alumina and iron oxide (magnesia for example may replace part of the lime, and iron oxide a part of the alumina) as are commonly known as hydraulic cements. Hydraulic cements include hydraulic limes, grappier cements, puzzalan cements, natural cements, and Portland cements. Puzzalan cements include slag cements made from slaked lime and granulated blast furnace slag. Because of its superior strength Portland cement is preferred among the hydraulic cements, but as the art of cements recognizes hydraulic cements as a definite class, and as results of value may be obtained with any member of that class, it is desired to claim all hydraulic cements.

In most oil well cementing and grouting operations it is generally desirable to use neat cement for added strength, but obviously it is always possible to add any desired amount of an inert granular filling material or aggregate such as sand, ground limestone, or any of the other well known inert aggregates, as long as the amount added does not reduce the strength below the desired value. In operations in open wells it is often desirable to use neat cement, because inert filling material will automatically become detached from the walls of the well, and will tend to mix with and dilute the slurry to such an extent that it is undesirable to add any filling material to the slurry being forced into the well.

The amount of water added is not critical, it being obvious that sufficient water should be added to form a pumpable slurry, and that when the slurry becomes pumpable no further water need be added. One advantage of the slurry of the present invention is that it is a low water-loss slurry, and therefore it is not necessary to add excess water over the amount making the slurry pumpable as a reserve for expected losses, which would tend to reduce the strength of the cement.

In order to reduce the water loss of the cement slurry we add a small but effective amount of a water-loss reducing additive soluble in an aqueous hydraulic cement slurry selected from the group consisting of starch ethers, and salts of said ethers, starch ethers with alkyl groups of 4 carbon atoms or less being preferred, and the alkali metal, alkaline earth metal and ammonium salts of said ethers being preferred.

For the purpose of illustrating the material with a formula, starch may be regarded as consisting of a number of anhydroglucose residues X, each having three hydroxyl radicals —OH thereon. The residue X is repeated a large number of times, represented by $n$, which may be 100 or more. Most of the OH radicals are unchanged, but enough of them are substituted (as will be explained below) to make the material water soluble. As degrees of substitution are difficult to determine, we have found that the degree of substitution rendering the material soluble in a water hydraulic cement slurry is a sufficient test for its utility. By soluble, we mean that it appears to be soluble to the eye, as whether it is a true solution or some sort of dispersion is not in question, the prior art referring to such materials as soluble. The material is of value to the extent that it is soluble, and border line substances may be used which are only partly or barely soluble, but better results are obtained when the material is clearly soluble.

While starches from various sources give comparable results, the so-called waxy starches from corn are preferred.

With C representing carbon, H hydrogen, O oxygen, M a metal, or hydrogen, or some basic radical such as $NH_4$, and S sulfur, the following formulas are supposedly those of the substances named directly below them:

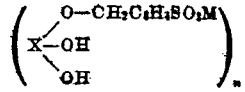

Acid sulfobenzyl starch ether and salts of the same. One or both of the hydrogen atoms in the alpha $CH_2$ group above may be substituted by a methyl, ethyl or propyl radical except that the number of carbon atoms in the entire resulting alkyl chain should not exceed four.

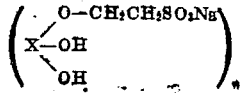

Sodium sulfoethyl starch ether, also known as sodium starch beta ethylsulfonate ether. The alkyl ethylene group $—CH_2CH_2$ may be replaced by the propylene or butylene group with similar results.

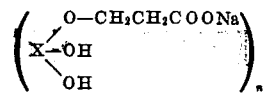

Sodium carboxyethyl starch ether. Acid, alkali metal, alkaline earth metal, ammonium and other salts of carboxymethyl, carboxyethyl, and carboxypropyl starch ethers are similar in results.

We have found that from 0.1% to 3% of a water-loss reducing additive soluble in an aqueous hydraulic cement slurry selected from the group consisting of starch ethers, and salts of said ethers, starch ethers with alkyl groups of 4 carbon atoms or less being preferred, and the alkali metal, alkaline earth metal and ammonium salts of said ethers being preferred, is particularly effective in reducing the water loss of hydraulic cement aqueous slurries, with or without inert filling material present.

A Portland cement slurry was made up to weigh fifteen pounds to the gallon of slurry and divided into portions, and 1% of each additive by weight (based on the dry Portland cement) was added to a separate portion of the sample. The various portions of the sample were tested separately according to the test procedure for drilling muds described in A. P. I. code 29 and the portion which had no additive lost 105 cc. of water in one minute and 15 seconds through the standard filter paper at 100 p. s. i., whereas under the exact same conditions the other portions of the sample containing the additives had low water losses as follows:

| Additive | Per cent present based on dry cement | Water loss, cc./30 min./100 p. s. i. |
|---|---|---|
| Sodium sulfobenzyl starch ether. | 1 | 3.9. |
| Sodium carboxyethyl starch ether. | 1 | 4.1. |
| Sodium sulfoethyl starch ether. | 1 | 6.7. |
| Sodium carboxymethyl starch ether. | 1 | 15 at 75° F.; 14 at 180° F. |

Obviously the portion without the additive, or with plain starch, would lose water to the formation of a well to such an extent that it would dehydrate and have a premature setting, or bridging effect, which would increase the pressure needed to place the slurry to a degree making the operation inoperative in many wells having porous formations, and the water from the slurry would contaminate such formations, whereas the portion of the sample containing the additives would not as readily give up water to such a formation, and would remain easily pumpable into place during the expected exposure to such a formation. "Impermix" is a trade marked product consisting of a waxy type corn starch which has been treated to make it more readily water soluble by pasting the starch, and is tested to show by contrast the improvement that starch ethers, insulin ethers and dextrin ethers and their salts give over "Impermix," a 1% mixture in the same cement slurry tested above lost 98 cc. in 3 minutes 5 seconds.

The cement slurry used in these tests was composed of 53 grams of water per 100 grams of standard Portland cement to give a cement slurry approximately 15 pounds per gallon. It is also obvious that inert filling material will not substantially affect the result of this test, when used in an amount not large enough to deleteriously reduce the strength of the cement slurry after setting.

The cement slurry used set at a rate such that in about one hour at 180° F. the slurry attained a viscosity of 100 poises as determined by a Haliburton consistometer. When 1% of sodium carboxymethyl starch ether was present this same viscosity was not reached until after 50 hours had passed, which shows that these cements are retarded as to set and are useful in wells.

The cement slurry set into a hard cement suitable for use in well cementing and grouting in every instance after the water-loss test described above except the blank sample and that containing starch, both of which seemed cracked and weakened due to lack of water when setting due to loss of water in the water-loss test.

In case the acid starch ethers are employed the alkaline earth metal and alkali metal ions present in the slurry will make the salt and obviously all are equivalent.

The above example and tests are given for illustrative purposes and should not be regarded as limiting the invention, the scope of which is set forth in the following claims.

Having described our invention, we claim:

1. A cement capable of forming a fluid slurry when mixed with water, said cement comprising a hydraulic cement mixed with a minor proportion of sodium sulfobenzyl starch ether.

2. A cement capable of forming a fluid slurry when mixed with water, said cement comprising Portland cement mixed with a minor proportion of sodium sulfobenzyl starch ether.

3. A hydraulic cement slurry comprising a hydraulic cement, water, and a minor proportion of sodium sulfobenzyl starch ether.

4. A hydraulic cement slurry comprising Portland cement, water, and a minor proportion of sodium sulfobenzyl starch ether.

5. A cement capable of forming a fluid slurry when mixed with water, said cement comprising a hydraulic cement mixed with a minor proportion of sodium carboxyethyl starch ether.

6. A cement capable of forming a fluid slurry when mixed with water, said cement comprising Portland cement mixed with a minor proportion of sodium carboxyethyl starch ether.

7. A hydraulic cement slurry comprising a hydraulic cement, water, and a minor proportion of sodium carboxyethyl starch ether.

8. A hydraulic cement slurry comprising Portland cement, water, and a minor proportion of sodium carboxyethyl starch ether.

9. A cement capable of forming a fluid slurry when mixed with water, said cement comprising a hydraulic cement mixed with a minor proportion of at least one of the group consisting of acid carboxyalkyl starch ethers, acid sulfoalkyl starch ethers, and acid sulfoalkylaryl starch ethers, in all of which the alkyl group contains from one to four carbon atoms, and the alkali metal, alkaline earth metal and ammonium salts of said starch ethers.

10. A cement capable of forming a fluid slurry when mixed with water, said cement comprising Portland cement mixed with a minor proportion of at least one of the group consisting of acid carboxyalkyl starch ethers, acid sulfoalkyl starch ethers, and acid sulfoalkylaryl starch ethers, in all of which the alkyl group contains from one to four carbon atoms, and the alkali metal, alkaline earth metal and ammonium salts of said starch ethers.

11. A hydraulic cement slurry comprising a hydraulic cement, water, and a minor proportion of at least one of the group consisting of acid carboxyalkyl starch ethers, acid sulfoalkyl starch ethers, and acid sulfoalkylaryl starch ethers, in all of which the alkyl group contains from one to four carbon atoms, and the alkali metal, alkaline earth metal and ammonium salts of said starch ethers.

12. A hydraulic cement slurry comprising Portland cement, water, and a minor proportion of at least one of the group consisting of acid carboxyalkyl starch ethers, acid sulfoalkyl starch ethers, and acid sulfoalkylaryl starch ethers, in all of which the alkyl group contains from one to four carbon atoms, and the alkali metal, alkaline earth metal and ammonium salts of said starch ethers.

13. A cement capable of forming a fluid slurry when mixed with water, said cement comprising a hydraulic cement mixed with a minor proportion of sodium sulfoethyl starch ether.

14. A cement capable of forming a fluid slurry when mixed with water, said cement comprising Portland cement mixed with a minor proportion of sodium sulfoethyl starch ether.

15. A hydraulic cement slurry comprising a hydraulic cement, water, and a minor proportion of sodium sulfoethyl starch ether.

16. A hydraulic cement slurry comprising Portland cement, water, and a minor proportion of sodium sulfoethyl starch ether.

17. A cement capable of forming a fluid slurry when mixed with water, said cement comprising a hydraulic cement mixed with a minor proportion of sodium carboxymethyl starch ether.

18. A cement capable of forming a fluid slurry when mixed with water, said cement comprising Portland cement mixed with a minor proportion of sodium carboxymethyl starch ether.

19. A hydraulic cement slurry comprising a hydraulic cement, water, and a minor proportion of sodium carboxymethyl starch ether.

20. A hydraulic cement slurry comprising Portland cement, water, and a minor proportion of sodium carboxymethyl starch ether.

21. The process of producing a hydraulic cement aqueous slurry having a reduced water loss to porous formations which comprises admixing with hydraulic cement a minor proportion effective to reduce the water loss of said slurry of at least one of the group consisting of acid carboxyalkyl starch ethers, acid sulfoalkyl starch ethers, and acid sulfoalkylaryl starch ethers, in all of which the alkyl group contains from one to four carbon atoms, and the alkali metal, alkaline earth metal and ammonium salts of said starch ethers, and interacting therewith sufficient water to produce a fluid slurry.

22. The process of producing a hydraulic cement aqueous slurry having a reduced water loss to porous formations which comprises admixing with hydraulic cement a minor proportion effective to reduce the water loss of said slurry of sodium sulfobenzyl starch ether, and interacting therewith sufficient water to produce a fluid slurry.

23. The process of producing a hydraulic cement aqueous slurry having a reduced water loss to porous formations which comprises admixing with hydraulic cement a minor proportion effective to reduce the water loss of said slurry of sodium carboxyethyl starch ether, and interacting therewith sufficient water to produce a fluid slurry.

24. The process of producing a hydraulic cement aqueous slurry having a reduced water loss to porous formations which comprises admixing with hydraulic cement a minor proportion effective to reduce the water loss of said slurry of sodium sulfoethyl starch ether, and interacting therewith sufficient water to produce a fluid slurry.

25. The process of producing a hydraulic cement aqueous slurry having a reduced water loss to porous formations which comprises admixing with hydraulic cement a minor proportion effective to reduce the water loss of said slurry of sodium carboxymethyl starch ether, and interacting therewith sufficient water to produce a fluid slurry.

26. The process of cementing a well which extends into a porous formation which comprises placing a hydraulic cement aqueous slurry having a reduced water loss adjacent to said porous formation by admixing with hydraulic cement a minor proportion effective to reduce the water loss of said slurry of at least one of the group consisting of acid carboxyalkyl starch ethers, acid sulfoalkyl starch ethers, and acid sulfoalkylaryl starch ethers, in all of which the alkyl group contains from one to four carbon atoms, and the alkali metal, alkaline earth metal and ammonium salts of said starch ethers, interacting therewith sufficient water to produce a fluid slurry and introducing said slurry into said well into contact with said porous formation.

27. The process of cementing a well which extends into a porous formation which comprises placing a hydraulic cement aqueous slurry having a reduced water loss adjacent to said porous formation by admixing with hydraulic cement a minor proportion effective to reduce the water loss of said slurry of sodium sulfobenzyl starch ether, interacting therewith sufficient water to produce a fluid slurry and introducing said slurry into said well into contact with said porous formation.

28. The process of cementing a well which extends into a porous formation which comprises placing a hydraulic cement aqueous slurry having a reduced water loss adjacent to said porous formation by admixing with hydraulic cement a minor proportion effective to reduce the water loss of said slurry of sodium carboxyethyl starch ether, interacting therewith sufficient water to produce a fluid slurry and introducing said slurry into said well into contact with said porous formation.

29. The process of cementing a well which extends into a porous formation which comprises placing a hydraulic cement aqueous slurry having a reduced water loss adjacent to said porous formation by admixing with hydraulic cement a minor proportion effective to reduce the water loss of said slurry of sodium sulfoethyl starch ether, interacting therewith sufficient water to produce a fluid slurry and introducing said slurry into said well into contact with said porous formation.

30. The process of cementing a well which extends into a porous formation which comprises placing a hydraulic cement aqueous slurry having a reduced water loss adjacent to said porous formation by admixing with hydraulic cement a minor proportion effective to reduce the water loss of said slurry of sodium carboxymethyl starch ether, interacting therewith sufficient water to produce a fluid slurry and introducing said slurry into said well into contact with said porous formation.

PEGGY J. LEA.
HENRY B. FISHER.

REFERENCES CITED

The following references are of record in the file of this patent:

UNITED STATES PATENTS

| Number | Name | Date |
| --- | --- | --- |
| 2,006,426 | Weiler | July 2, 1935 |
| 2,429,211 | Andes | Oct. 21, 1947 |
| 2,470,505 | Ludwig | May 17, 1949 |

Certificate of Correction

Patent No. 2,562,148  
July 24, 1951

PEGGY J. LEA ET AL.

It is hereby certified that error appears in the printed specification of the above numbered patent requiring correction as follows:

Column 4, line 3, for "—CH$_2$CH$_2$" read —$CH_2CH_2$—; line 71, for "insulin" read *inulin*;

and that the said Letters Patent should be read as corrected above, so that the same may conform to the record of the case in the Patent Office.

Signed and sealed this 18th day of December, A. D. 1951.

[SEAL]

THOMAS F. MURPHY,  
*Assistant Commissioner of Patents.*